(12) United States Patent
Rambo et al.

(10) Patent No.: US 10,494,949 B2
(45) Date of Patent: Dec. 3, 2019

(54) OIL COOLING SYSTEMS FOR A GAS TURBINE ENGINE

(71) Applicant: GENERAL ELECTRIC COMPANY, Schenectady, NY (US)

(72) Inventors: Jeffrey Douglas Rambo, Mason, OH (US); Andrew Martin, Blue Ash, OH (US); Curtis Walton Stover, Mason, OH (US); Jared Matthew Wolfe, West Chester, OH (US); Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 391 days.

(21) Appl. No.: 15/229,466

(22) Filed: Aug. 5, 2016

(65) Prior Publication Data

US 2018/0038243 A1 Feb. 8, 2018

(51) Int. Cl.
*F01D 25/14* (2006.01)
*F01D 17/10* (2006.01)
(Continued)

(52) U.S. Cl.
CPC .......... *F01D 25/14* (2013.01); *F01D 17/105* (2013.01); *F01D 17/145* (2013.01); *F01D 17/162* (2013.01); *F01D 25/12* (2013.01); *F02C 6/08* (2013.01); *F02C 7/14* (2013.01); *F02C 7/18* (2013.01); *F02K 3/06* (2013.01); *F02K 3/115* (2013.01); *F04D 19/002* (2013.01); *F04D 29/542* (2013.01); *F05D 2220/32* (2013.01);
(Continued)

(58) Field of Classification Search
CPC .......... F01D 25/12; F02C 7/185; F02C 7/125; F05D 2260/20; F05D 2260/213
See application file for complete search history.

(56) References Cited

U.S. PATENT DOCUMENTS

| 4,546,605 A | 10/1985 | Mortimer et al. |
| 5,269,135 A | 12/1993 | Vermejan et al. |
| (Continued) | | |

FOREIGN PATENT DOCUMENTS

| EP | 0511770 A1 | 11/1992 |
| EP | 2 584 168 A2 | 4/2013 |

OTHER PUBLICATIONS

International Search Report and Written Opinion issued in connection with corresponding PCT Application No. PCT/US2017/42589 dated Oct. 19, 2017.

*Primary Examiner* — Todd E Manahan
*Assistant Examiner* — Rodolphe Andre Chabreyrie
(74) *Attorney, Agent, or Firm* — General Electric; James Reed

(57) ABSTRACT

A heat exchanger assembly for a gas turbine engine that includes an outer engine case. The heat exchanger assembly includes at least one cooling channel, the at least one cooling channel is configured to receive a flow of fluid to be cooled. At least one first coolant flow duct that is configured to receive a flow of a first coolant, wherein the at least one cooling channel is disposed between a first inlet and a first outlet. The heat exchanger assembly further include at least one second coolant flow duct that is configured to receive a flow of a second coolant, wherein the at least one cooling channel is disposed between a second inlet and a second outlet.

17 Claims, 6 Drawing Sheets

(51) Int. Cl.
  *F01D 17/16* (2006.01)
  *F01D 25/12* (2006.01)
  *F02K 3/06* (2006.01)
  *F04D 29/54* (2006.01)
  *F02C 6/08* (2006.01)
  *F02C 7/14* (2006.01)
  *F02C 7/18* (2006.01)
  *F01D 17/14* (2006.01)
  *F04D 19/00* (2006.01)
  *F02K 3/115* (2006.01)

(52) U.S. Cl.
  CPC .. *F05D 2260/213* (2013.01); *F05D 2260/601* (2013.01); *F05D 2260/98* (2013.01); *Y02T 50/676* (2013.01)

(56) References Cited

U.S. PATENT DOCUMENTS

| | | | |
|---|---|---|---|
| 5,351,473 A * | 10/1994 | Shuba | F01D 17/105 60/782 |
| 5,438,823 A * | 8/1995 | Loxley | F01D 25/18 165/41 |
| 7,810,312 B2 | 10/2010 | Stretton et al. | |
| 10,036,329 B2 * | 7/2018 | Suciu | F02K 3/115 |
| 2011/0067412 A1 | 3/2011 | Stretton | |
| 2012/0128467 A1 * | 5/2012 | Ruthemeyer | F01D 5/146 415/115 |
| 2013/0098046 A1 * | 4/2013 | Suciu | F02C 7/08 60/772 |
| 2013/0192240 A1 * | 8/2013 | Munsell | F02C 6/08 60/772 |
| 2014/0044517 A1 * | 2/2014 | Saha | F02C 7/052 415/1 |
| 2015/0121842 A1 * | 5/2015 | Moes | B64D 13/06 60/204 |
| 2015/0247462 A1 * | 9/2015 | Suciu | F02K 3/115 415/1 |
| 2016/0024965 A1 * | 1/2016 | Schwarz | F02C 7/14 415/122.1 |
| 2016/0024968 A1 * | 1/2016 | Stearns | F01D 25/12 60/39.08 |
| 2016/0131036 A1 * | 5/2016 | Bintz | F02C 7/16 60/779 |
| 2016/0369697 A1 * | 12/2016 | Schwarz | F01P 7/02 |

\* cited by examiner

OIL COOLING SYSTEMS FOR A GAS TURBINE ENGINE

BACKGROUND

The field of the disclosure relates generally to gas turbine engines and, more particularly, to oil cooling systems for a gas turbine engine.

Gas turbine engines, such as turbofans, generally include an oil system that distributes engine oil used to cool and lubricate components within the gas turbine engine. As turbofan engines become larger, faster, and more powerful, more heat within the engine oil needs to be dissipated, thus increasing cooling requirements of an oil cooling system that facilitates extracting heat from the engine oil.

At least some known oil cooling systems include heat exchangers that are positioned within a bypass duct that draws a fan stream air therethrough for turbofan propulsion. Oil is channeled through the heat exchangers where the fan stream air is used as a coolant and heat is transferred from the oil to the fan stream air. However, some heat exchangers are known to create drag within the fan stream air which decreases turbofan engine efficiency. Moreover, during turbofan engine low speed conditions, such as ground operating conditions, the fan stream air drawn through the bypass duct is low or not-present, decreasing the effectiveness of the heat exchangers. Furthermore, dedicated oil cooling systems for engine low speed conditions increase the weight of the turbofan engine, which also decreases overall efficiency.

BRIEF DESCRIPTION

In one embodiment, a heat exchanger assembly for a gas turbine engine is provided. The gas turbine engine includes an outer engine case. The heat exchanger assembly includes at least one cooling channel adjacent the outer engine case, the at least one cooling channel is configured to receive a flow of fluid to be cooled. At least one first coolant flow duct that is configured to receive a flow of a first coolant from a first inlet to a first outlet, wherein the at least one cooling channel is disposed between the first inlet and the first outlet. The heat exchanger assembly further includes at least one second coolant flow duct that is configured to receive a flow of a second coolant from a second inlet to a second outlet, wherein the at least one cooling channel is disposed between the second inlet and the second outlet.

In another embodiment, a gas turbine engine is provided. The gas turbine engine includes an engine assembly including an outer engine case. A fan case assembly at least partially surrounding the outer engine case defining a bypass duct configured to receive a fan stream flow. An outlet guide vane assembly including a plurality of outlet guide vane segments coupled between the engine assembly and the fan case assembly, the plurality of outlet guide vane segments spaced circumferentially about the engine assembly. The gas turbine engine further includes a heat exchanger assembly adjacent the outer engine case. The heat exchanger assembly includes at least one cooling channel recessed within the outer engine case, the at least one cooling channel is configured to receive a flow of fluid to be cooled. At least one first coolant flow duct that is configured to receive a flow of a first coolant from a first inlet to a first outlet during low engine speeds, wherein the at least one cooling channel is disposed between the first inlet and the first outlet. The heat exchanger assembly further includes at least one second coolant flow duct that is configured to receive a flow of a second coolant from a second inlet to a second outlet during high engine speeds, wherein the at least one cooling channel is disposed between the second inlet and the second outlet.

In a further embodiment, a heat exchanger assembly for a gas turbine engine is provided. The gas turbine engine includes a fan case and an outer engine case defining a bypass duct that is configured to receive a fan stream flow. The heat exchanger assembly includes at least one cooling channel adjacent the bypass duct, the at least one cooling channel is configured to receive a flow of fluid to be cooled. At least one coolant flow duct that is configured to receive a flow of coolant from at least one inlet defined within the bypass duct to at least one outlet, wherein the at least one cooling channel is disposed between the at least one inlet and the at least one outlet. The heat exchanger assembly further includes at least one ejector disposed downstream of the at least one cooling channel, the at least one ejector is configured to selectively receive a flow of high pressure fluid and draw the coolant flow through the at least one coolant flow duct.

DRAWINGS

These and other features, aspects, and advantages of the present disclosure will become better understood when the following detailed description is read with reference to the accompanying drawings in which like characters represent like parts throughout the drawings, wherein.

Figure 1:
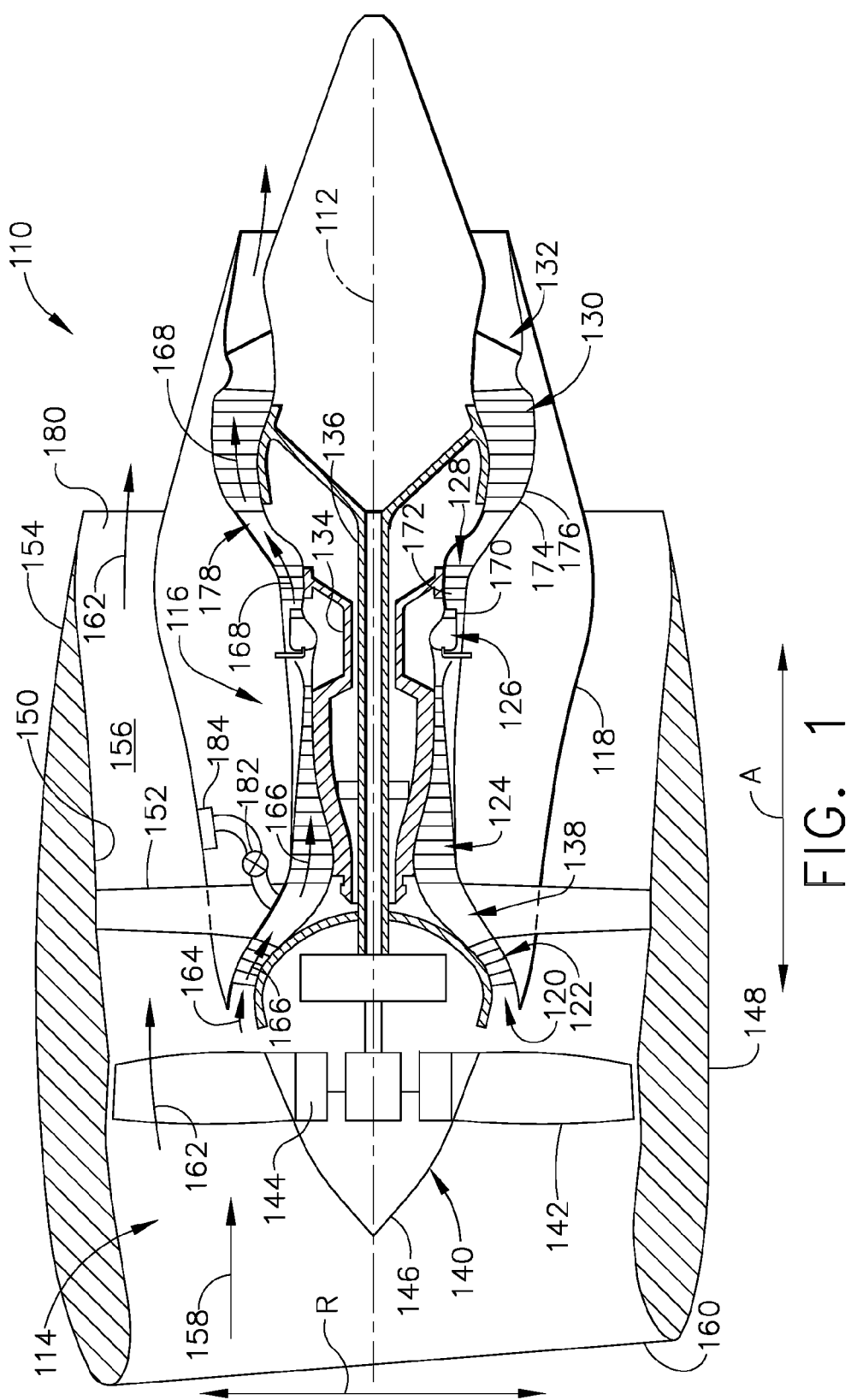
FIG. 1 is a schematic, cross-sectional illustration of an exemplary turbofan engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of an oil cooling system as described herein provide a multiple cooling path heat exchanger assembly that facilitates cooling engine oil subjected to high heat demands during both low speed engine operating conditions and high speed engine operating conditions. Specifically, the heat exchanger assembly includes a cooling channel that receives a flow of oil to be cooled. The heat exchanger assembly further includes a first coolant flow duct that is in flow communication with a variable bleed valve (VBV) system such that during low speed engine operating conditions a VBV discharge flow is provided as coolant, and a second coolant flow duct that is in flow communication with a bypass duct such that during high speed engine operating conditions a fan stream air flow is provided as coolant. In various embodiments, the heat exchanger assembly also includes an ejector such that the coolant flowing through the heat exchanger may be further controllable. In certain embodiments, the coolant flows are exhausted into the bypass duct, while in other embodiments, the coolant flows are exhausted to a thermal management system for further thermal management of engine components. The heat exchanger assembly may also be coupled to additional heat exchanger assemblies forming a larger oil cooling system within the bypass duct. In addition to thermal management of engine oil, the heat exchanger assembly also facilitates boundary layer suction of fan stream air at the bypass duct, increasing propulsive thrust therethrough.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan case assembly 114 and a gas turbine engine 116 disposed downstream from fan case assembly 114.

Gas turbine engine 116 includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, turbine section, and exhaust nozzle section 132 together define an air flow path 138.

In the exemplary embodiment, fan case assembly 114 includes a fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal centerline 112 by LP shaft 136.

Referring still to the exemplary embodiment of FIG. 1, disk 144 is covered by a rotatable front hub 146 aerodynamically contoured to promote an airflow through plurality of fan blades 142. Additionally, exemplary fan case assembly 114 includes an annular fan casing or outer nacelle 148 that circumferentially surrounds fan 140 and/or at least a portion of gas turbine engine 116. Nacelle 148 includes an inner radial surface 150 opposite engine outer casing 118. Nacelle 148 is supported relative to gas turbine engine 116 by an outlet guide vane (OGV) assembly 152. Moreover, a downstream section 154 of nacelle 148 may extend over an outer portion of gas turbine engine 116 so as to define a bypass airflow duct 156 between radially inner surface 150 and outer casing 118.

During operation of turbofan engine 110, a volume of air 158 enters turbofan engine 110 through an associated inlet 160 of nacelle 148 and/or fan case assembly 114. As air 158 passes across fan blades 142, a first portion of air 158 as indicated by arrow 162, known as fan stream air flow, is directed or routed into bypass airflow duct 156 and a second portion of air 158 as indicated by arrow 164 is directed or routed into air flow path 138, or more specifically into booster compressor 122. The ratio between first portion of air 162 and second portion of air 164 is commonly known as a bypass ratio. The pressure of second portion of air 164 is then increased, as compressor air 166, as it is routed through booster compressor 122 and HP compressor 124 and into combustion section 126, where it is mixed with fuel and burned to provide combustion gases 168.

Combustion gases 168 are routed through HP turbine 128 where a portion of thermal and/or kinetic energy from combustion gases 168 is extracted via sequential stages of HP turbine stator vanes 170 that are coupled to outer casing 118 and HP turbine rotor blades 172 that are coupled to HP shaft or spool 134, thus causing HP shaft or spool 134 to rotate, thereby supporting operation of HP compressor 124. Combustion gases 168 are then routed through LP turbine 130 where a second portion of thermal and kinetic energy is extracted from combustion gases 168 via sequential stages of LP turbine stator vanes 174 that are coupled to outer casing 118 and LP turbine rotor blades 176 that are coupled to LP shaft or spool 136, thus causing LP shaft or spool 136 to rotate, thereby supporting operation of booster compressor 122 and/or rotation of fan 140. Combustion gases 168 are subsequently routed through jet exhaust nozzle section 132 of gas turbine engine 116 to provide propulsive thrust. HP turbine 128, LP turbine 130, and jet exhaust nozzle section 132 at least partially define a hot gas path 178 for routing combustion gases 168 through gas turbine engine 116. Simultaneously, the pressure of fan stream air 162 is substantially increased as fan stream air 162 is routed through bypass airflow duct 156, including through outlet guide vane assembly 152 before it is exhausted from a fan nozzle exhaust section 180 of turbofan engine 110, also providing propulsive thrust.

In the exemplary embodiment, turbofan engine 110 further includes a variable bleed valve (VBV) system 182 coupled in flow communication between LP compressor 122 and HP compressor 124. During engine operation at low speeds, for example, during engine start conditions, compressor air 166 that is channeled through LP compressor 122 is extracted through VBV system 182 and exhausted from turbofan engine 110 through bypass airflow duct 156. At high speed engine operation VBV system 182 closes and compressor air 166 is channeled towards HP compressor 124. Moreover, in the exemplary embodiment, turbofan engine 110 includes an oil cooling system 184 coupled in flow communication with VBV system 182 and bypass airflow duct 156. As discussed further below in reference to FIGS. 2-6, oil cooling system 184 facilitates extracting heat from a flow of engine oil (not shown) within turbofan engine 110 via air flows within VBV system 182 and bypass airflow duct 156.

It should be appreciated, however, that the exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turbo-prop engine, a military purpose engine, and a marine or land-based aero-derivative engine.

Figure 2:
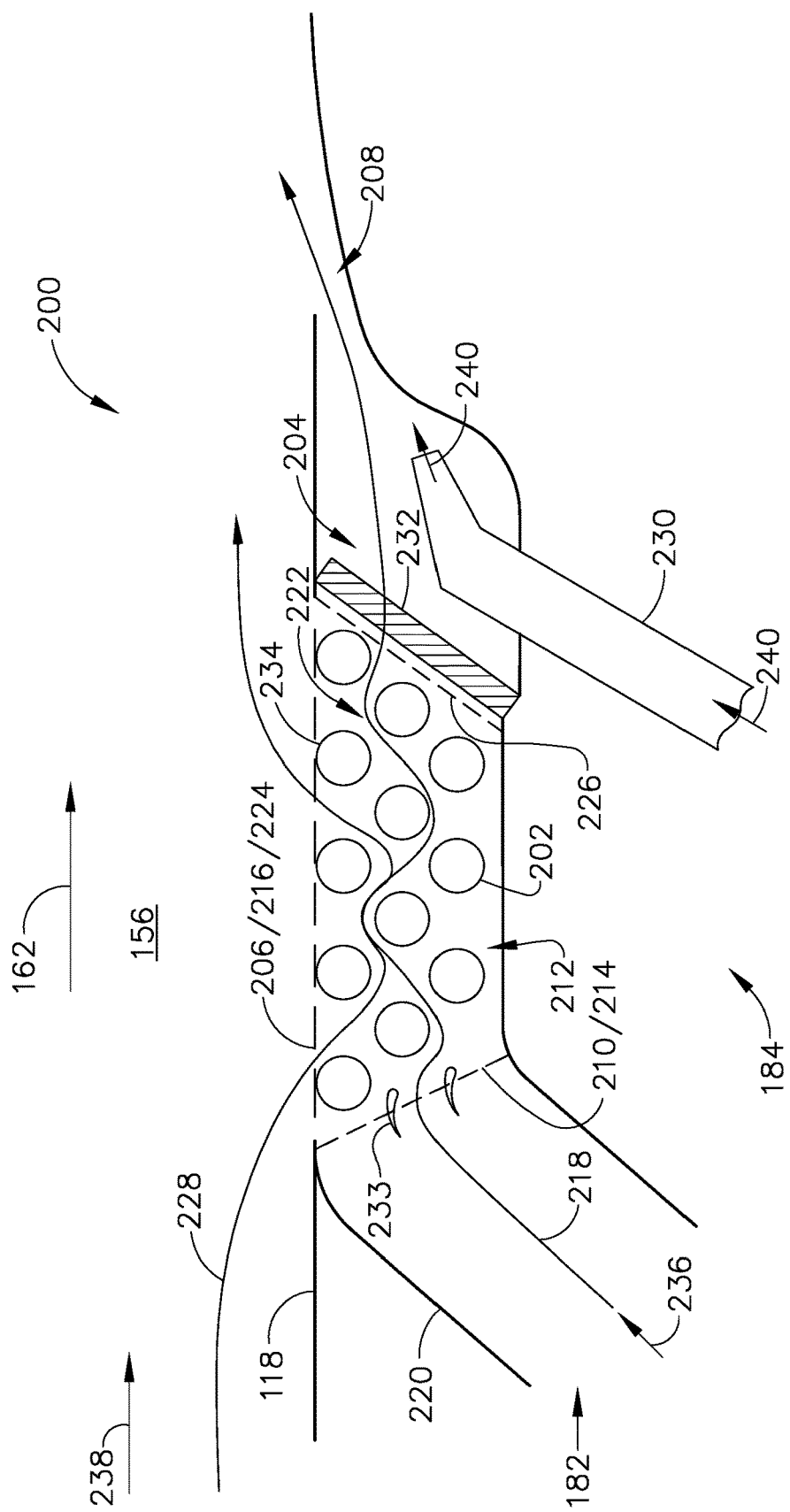
FIG. 2 is a schematic, cross-sectional view of an exemplary heat exchanger assembly that may be used with the turbofan engine shown in FIG. 1.

FIG. 2 is a schematic, cross-sectional view of an exemplary heat exchanger assembly 200 that may be used with oil cooling system 184 of turbofan engine 110 (shown in FIG. 1). In the exemplary embodiment, heat exchanger assembly 200 is a tubular heat exchanger. In some embodiments, heat exchanger assembly 200 is a finned-tube heat exchanger. In alternative embodiments, heat exchanger assembly 200 may include any other heat transfer features such as strakes, dimples, and others that enable heat exchanger assembly 200 to function as described herein. Heat exchanger assembly 200 includes a plurality of cooling channels 202 positioned within a recess 204 defined within engine outer casing 118 and adjacent to bypass duct 156. In the exemplary embodiment, cooling channels 202 are substantially circular in cross-section. Additionally or alternatively, cooling channels 202 may have any other cross-section that enables heat exchanger assembly 200 to function as described herein. Furthermore, cooling channels 202 may vary in cross-sectional area and/or vary in pitch across a coolant flow path. Recess 204 is open to bypass duct 156 at locations 206 and 208 within engine outer casing 118 such that recess 204 is in flow communication with bypass duct 156. Additionally, recess 204 is open to VBV system 182 at location 210 within engine outer casing 118 such that recess 204 is also in flow communication with VBV system 182.

Heat exchanger assembly 200 also includes at least one first coolant flow duct 212 having a first inlet 214 and a first outlet 216 such that a first fluid flow path 218 is defined therethrough, with cooling channels 202 disposed between first inlet 214 and first outlet 216. First inlet and outlet 214 and 216 are further defined within VBV system 182. Specifically, VBV system 182 includes a duct 220 that extends between LP compressor 122 (shown in FIG. 1) and engine outer casing 118. First inlet 214 is defined within VBV duct 220 upstream of cooling channels 202, while first outlet 216 is defined within engine outer casing 118 downstream of cooling channels 202, such that first fluid flow path 218 is defined from VBV duct 220, through cooling channels 202, to bypass duct 156.

Heat exchanger assembly 200 further includes at least one second coolant flow duct 222 having a second inlet 224 and a second outlet 226 such that a second fluid flow path 228 is defined therethrough with cooling channels 202 disposed between second inlet 224 and second outlet 226. Second inlet and outlet 224 and 226 are further defined within bypass duct 156. Specifically, second inlet 224 is defined within engine outer casing 118 upstream of cooling channels 202, while second outlet 226 is defined within outer casing recess 204 downstream of cooling channels 202, such that second fluid flow path 228 is defined from bypass duct 156, through cooling channels 202, and back to bypass duct 156. In the exemplary embodiment, first outlet 216 substantially corresponds with second inlet 224 such that first fluid flow path 218 exits heat exchanger assembly 200 at the same location which second fluid flow path 228 enters heat exchanger assembly 200.

In the exemplary embodiment, heat exchanger assembly 200 also includes at least one ejector 230 downstream of cooling channels 202 within recess 204 and in second fluid flow path 228. Additionally, a filter 232 is positioned between cooling channels 202 and ejector 230 in second fluid flow path 228. In some embodiments, filter 232 may include a perforated plate with apertures of varying sizes defined therein to facilitate balancing flow across second outlet 226 such that flow across second outlet 226 occurs along the entire outlet area. Further, in the exemplary embodiment, heat exchanger assembly 200 includes at least one turning vane 233 disposed at first inlet 214 that facilitates directing and distributing flow through heat exchanger assembly 200. In alternative embodiments, heat exchanger assembly 200 has any other configuration that enables heat exchanger assembly 200 to function as described herein.

During operation of turbofan engine 110, oil 234 flows through turbofan engine 110 where it accumulates heat, for example, from the rotating components therein. Oil 234 is then channeled through heat exchanger assembly 200 and the plurality of cooling channels 202 for heat to be extracted therefrom. Specifically, when heat exchanger assembly 200 is in a first operational mode, during low speed engine operation, pressurized VBV discharge air 236 is bled from LP compressor 122 through VBV system 182. VBV discharge air 236 is channeled into first coolant flow duct 212 at first inlet 214 where it is used to cool oil 234 within heat exchanger assembly 200. For example, VBV discharge air 236 is channeled through first coolant flow duct 212 via first fluid flow path 218. In some embodiments, turning vanes 233 facilitate directing first fluid flow path 218 through first inlet 214. VBV discharge air 236 then exits first coolant flow duct 212 at first outlet 216 where it is exhausted into bypass duct 156 and exits turbofan engine 110. When heat exchanger assembly 200 is in a second operational mode, during high speed engine operation, VBV system 182 is closed and does not bleed air from LP compressor 122. As such, to cool oil 234 flowing through heat exchanger assembly 200, a portion of fan stream air 162, fan air 238, flowing through bypass duct 156 is channeled through heat exchanger assembly 200. Fan air 238 is channeled into second coolant flow duct 222 at second inlet 224 where it is used to cool oil 234 within heat exchanger assembly 200. For example, fan air 238 is channeled through second coolant flow duct 222 via second fluid flow path 228. Fan air 238 then exits second coolant flow duct 222 at second outlet 226 where it is exhausted back into bypass duct 156 through engine outer casing opening 208 providing propulsive thrust.

In some embodiments, during high speed engine operation, fan air 238 is drawn through second coolant flow duct 222 by ejector 230. High pressure bleed air 240 is extracted from HP compressor 124 and acts as a motive fluid that is channeled through ejector 230 to draw fan air 238 into recess 204 and heat exchanger assembly 200. Ejector 230 further allows for the flow of fan air 238 to be controllable through second coolant flow duct 222 such that the amount of heat extracted from oil 234 within heat exchanger assembly 200 is controllable. For example, on one hand, when a low flow of bleed air 240 is provided to ejector 230, a lower fan air flow 238 will be drawn through heat exchanger assembly 200 providing less coolant and reducing heat transfer from oil 234 to fan air 238. While on the other hand, when a high flow of bleed air 240 is provided to ejector 230, a higher fan air flow 238 will be drawn through heat exchanger assembly 200 providing more coolant and increasing heat transfer from oil 234 to fan air 238. Bleed air 240 is then mixed with fan air 238 downstream of ejector 230 where it is also exhausted back into bypass duct 156 through engine outer casing opening 208.

Additionally, second inlet 224 of heat exchanger assembly 200 is positioned at engine outer casing 118 of bypass duct 156 wherein a boundary layer of fan stream air flow 162 can be formed. A boundary layer is a layer of viscous fluid that is generally formed close to a surface, such as engine out casing 118, which contains a fluid flow, such as fan stream air 162. Presence of the boundary layer creates drag on fan stream air 162, reducing propulsive thrust and engine efficiency. Heat exchanger assembly 200, in addition to facilitating cooling of oil 234, facilitates bleeding or removing the boundary layer formed at engine outer casing 118 through second coolant flow duct 222 and increasing propulsive thrust and engine efficiency. In some embodiments, ejector 230 further facilitates bleeding the boundary layer of fan stream air 162 through second coolant flow duct 222.

Furthermore, in the exemplary embodiment heat exchanger assembly 200 is illustrated within bypass duct 156 of a ducted turbofan engine. Additionally or alternatively, heat exchanger assembly 200 may also be used within a turbofan engine that is un-ducted, wherein fan 140 (shown in FIG. 1) may be disposed at the back of engine 116 (shown in FIG. 1), such that air flow adjacent to engine outer casing 118 is drawn into heat exchanger assembly 200. Moreover, heat exchanger assembly 200 may be formed within a turbofan engine 110 as a retrofit.

Figure 3:
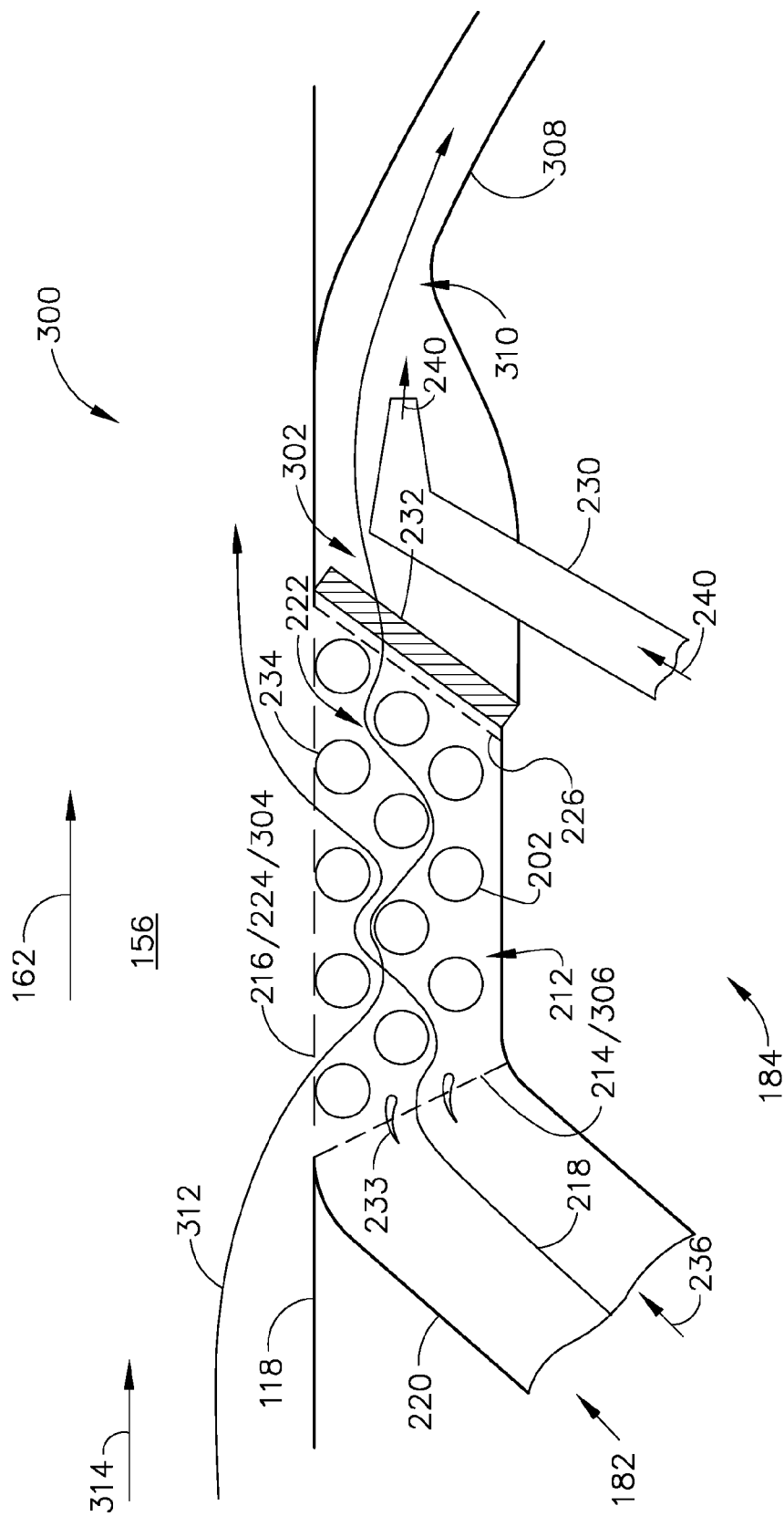
FIG. 3 is a schematic, cross-sectional view of another exemplary heat exchanger assembly that may be used with the turbofan engine shown in FIG. 1.

FIG. 3 is a schematic, cross-sectional view of another exemplary heat exchanger assembly 300 that may be used with oil cooling system 184 of turbofan engine 110 (shown in FIG. 1). Similar to heat exchanger assembly 200 (shown in FIG. 2), in this exemplary embodiment, heat exchanger assembly 300 is a tubular heat exchanger that includes cooling channels 202 positioned within a recess 302 defined within engine outer casing 118 and adjacent to bypass duct 156. Additionally, first coolant flow duct 212 defines first fluid flow path 218 with cooling channels 202 disposed between first inlet 214 and first outlet 216, and second coolant flow duct 222 includes cooling channels 202 disposed between second inlet 224 and second outlet 226. However, in this exemplary embodiment, recess 302 is open to bypass duct 156 at location 304 within engine outer casing 118 such that recess 302 is in flow communication with bypass duct 156. Recess 302 is open to VBV system 182 at location 306 within engine outer casing 118 such that recess 302 is in flow communication with VBV system 182. Recess 302 is further open to a thermal management system 308 at location 310 such that recess is in flow communication with thermal management system 308. Furthermore, second coolant flow duct 222 defines a second fluid flow path 312 between second inlet 224 and second outlet 226.

In this exemplary embodiment, when heat exchanger assembly 300 is in a second operational mode during high speed engine operation. A portion of fan stream air 162, fan air 314, flowing through bypass duct 156 is channeled through heat exchanger assembly 300. Fan air 314 is channeled into second coolant flow duct 222 at second inlet 224 where it is used to cool oil 234 within heat exchanger assembly 300. For example, fan air 314 is channeled through second coolant flow duct 222 via second fluid flow path 312. Fan air 314 then exits second coolant flow duct 222 at second outlet 226 where it is channeled to thermal management system 308 wherein fan air 314 is further used for cooling other areas of turbofan engine 110. Because fan stream air 162 and fan air 314 may have particulates entrained therein, for example during engine operation in arid climates including sand and dust, heat exchanger assembly 300 also includes filter 232 that filters out the particulates such that the particulates do not flow into thermal management system 308 and affect other engine components.

In some embodiments, during high speed engine operation, fan air 314 is drawn through second coolant flow duct 222 by ejector 230 as described above in reference to FIG. 2. Bleed air 240 is then mixed with fan air 314 downstream of ejector 230 where it is also channeled to thermal management system 308 wherein fan air 314 and bleed air 240 are further used for cooling other areas of turbofan engine 110. In this embodiment, bleed air 240 has already been filtered for particulates and ejector 230 is positioned downstream of filter 232. In alternative embodiments, filter 232 may be positioned anywhere that enables heat exchanger assembly 300 to function as described herein, for example filter may be positioned downstream of both cooling channels 202 and ejector 230.

Figure 4:
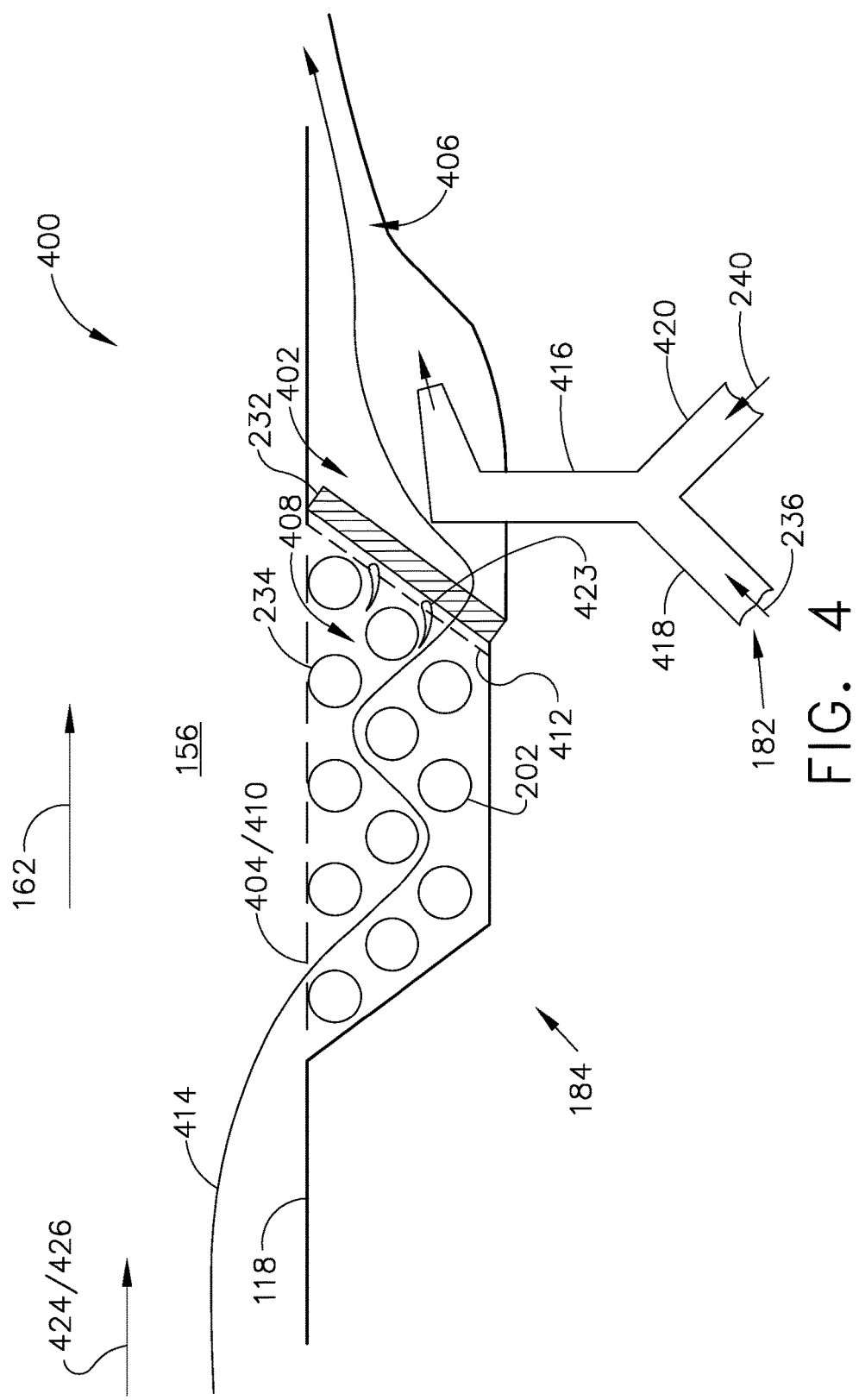
FIG. 4 is a schematic, cross-sectional view of a further exemplary heat exchanger assembly that may be used with the turbofan engine shown in FIG. 1.

FIG. 4 is a schematic, cross-sectional view of a further exemplary heat exchanger assembly 400 that may be used with oil cooling system 184 of turbofan engine 110 (shown in FIG. 1). Similar to heat exchanger assemblies 200 and 300 (shown in FIGS. 2 and 3 respectively), in this exemplary embodiment, heat exchanger assembly 400 is a finned-tube heat exchanger that includes cooling channels 202 positioned within a recess 402 defined within engine outer casing 118 and adjacent to bypass duct 156. However, in this exemplary embodiment, recess 402 is open to bypass duct 156 at locations 404 and 406 within engine outer casing 118 such that recess 402 is in flow communication with bypass duct 156. Heat exchanger assembly 400 includes only one coolant flow duct, at least one coolant flow duct 408, having an inlet 410 and an outlet 412 such that a fluid flow path 414 is defined therethrough, with cooling channels 202 disposed between inlet 410 and outlet 412. Inlet and outlet 410 and 412 are further defined within bypass duct 156. Specifically, inlet 410 is defined within engine outer casing 118 upstream of cooling channels 202, while outlet 412 is defined within outer casing recess 204 downstream of cooling channels 202, such that a fluid flow path 414 is defined from bypass duct 156, through cooling channels 202, and back to bypass duct 156.

In this exemplary embodiment, heat exchanger assembly 400 further includes an ejector 416 downstream of cooling channels 202 within recess 402 and in fluid flow path 414. Ejector 416 is wye-shaped ejector with a first inlet 418 and a second inlet 420, as well as, one outlet 422. Specifically, ejector first inlet 418 is coupled in flow communication with VBV system 182 and ejector second inlet 420 is coupled in flow communication with a compressor bleed system (not shown). Further, in the exemplary embodiment, heat exchanger assembly 400 includes at least one turning vane 423 disposed at outlet 412 that facilitates directing and distributing flow through heat exchanger assembly 400.

During operation of turbofan engine 110, oil 234 is channeled through heat exchanger assembly 400 and the plurality of cooling channels 202 for heat to be extracted therefrom. Specifically, heat exchanger assembly 400 is in a first operational mode during low speed engine operation, pressurized VBV discharge air 236 is bled from LP compressor 122 through VBV system 182 and channeled to ejector 416 to act as a motive fluid to draw in ambient air 424 from bypass duct 156. Ambient air 424 is channeled into coolant flow duct 408 at inlet 410 where it is used to cool oil 234 within heat exchanger assembly 200. For example, ambient air 424 is channeled through coolant flow duct 408 via fluid flow path 414. Ambient air 424 then exits coolant flow duct 408 at outlet 412 where it is exhausted into bypass duct 156 along with VBV discharge air 236 from ejector 416 at engine outer casing opening 406. In some embodiments, turning vanes 423 facilitate directing fluid flow path 414 through outlet 412. Heat exchanger assembly 400 is in a second operational mode during high speed engine operation, wherein VBV system 182 is closed and does not bleed air from LP compressor 122. As such, to cool oil 234 flowing through heat exchanger assembly 400, bleed air 240 is extracted from HP compressor 124 and channeled to ejector 416 to act as a motive fluid to draw in a portion of fan stream air 162, fan air 426, flowing through bypass duct 156. Similar to ambient air 424, fan air 426 is channeled into coolant flow duct 408 at inlet 410 where it is used to cool oil 234 within heat exchanger assembly 400. For example, fan air 426 is channeled through coolant flow duct 408 via fluid flow path 414. Fan air 426 then exits coolant flow duct 408 at outlet 412 where it is exhausted back into bypass duct 156 along with bleed air 240 from ejector 416 at engine outer casing opening 406.

In alternative embodiments, recess 402 is open to a thermal management system 308 (shown in FIG. 3) at location 406 such that ambient air 424 and fan air 426 exiting coolant flow duct 408 at outlet 412 is channeled to thermal management system 308 wherein it is further used for cooling other areas of turbofan engine 110.

Figure 5:
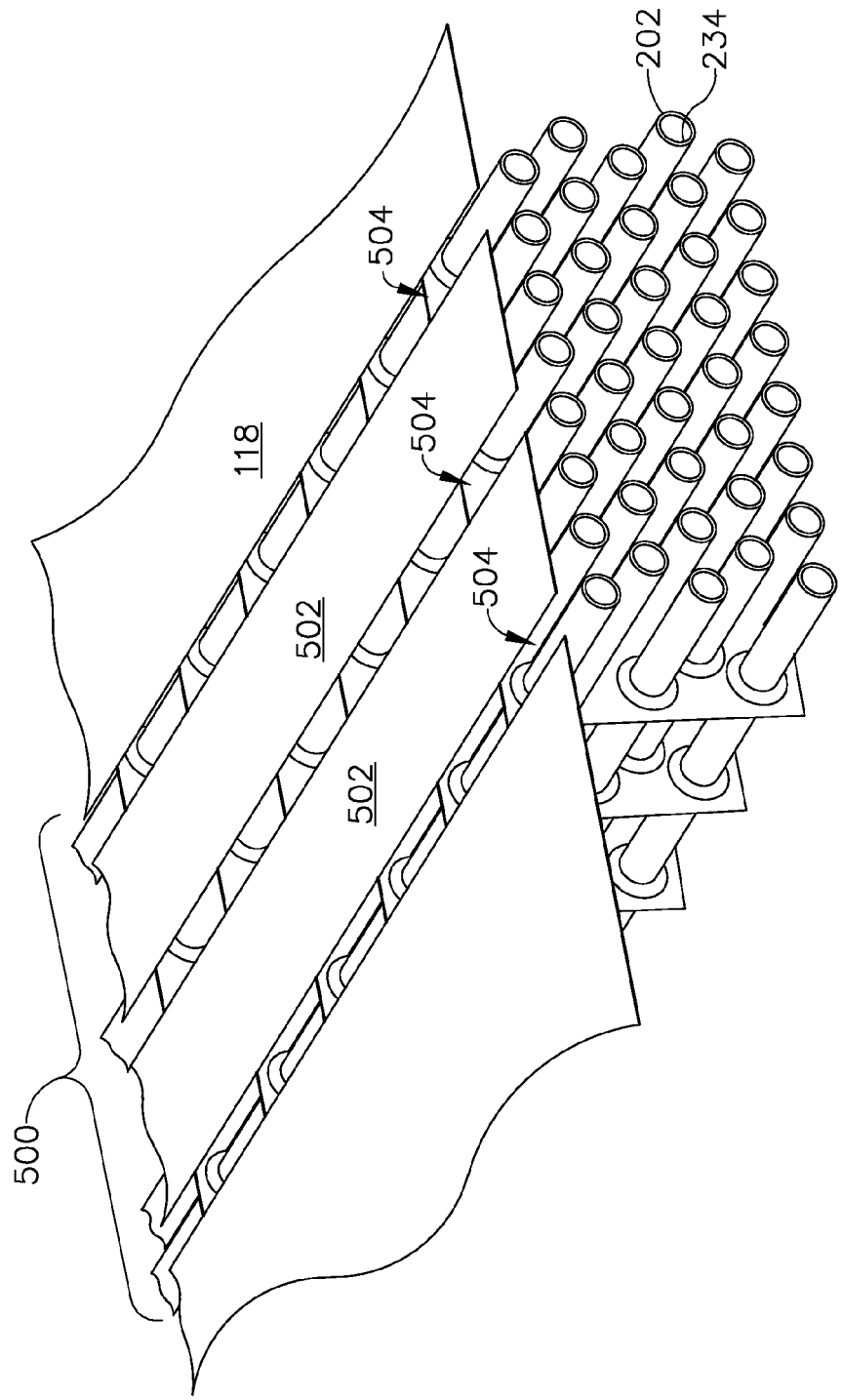
FIG. 5 is a perspective view of an exemplary bypass duct opening that may be used with the heat exchanger assemblies shown in FIGS. 2-4.

FIG. 5 is a perspective view of an exemplary bypass duct opening 500 that may be used with heat exchanger assemblies 200, 300, and 400 (shown in FIGS. 2-4). In the exemplary embodiment, a plurality of tubular cooling channels 202 are recessed within engine outer casing 118 that includes bypass duct opening 500 formed therein. Opening 500 may be opening 206 as illustrated in FIG. 2, or opening 304 as illustrated in FIG. 3, or opening 404 as illustrated in FIG. 4. In alternative embodiments, cooling channels 202 may be flush with engine outer casing 118 or proud of engine outer casing 118 to further facilitate cooling oil 234 within. Additionally or alternatively, opening 500 may include at least one cover 502 such that a plurality of smaller openings 504 is defined. Covers 502 and openings 504 facilitate adjusting and controlling the amount of boundary layer bleed from within bypass duct 156 as described further above in reference to FIG. 2. By providing multiple openings 504 spaced apart in a predetermined distance, the boundary layer that forms within bypass duct 156 of fan stream air 162 (shown in FIG. 1) is allowed to develop over cover 502 and then removed and allowed to develop again.

Figure 6:
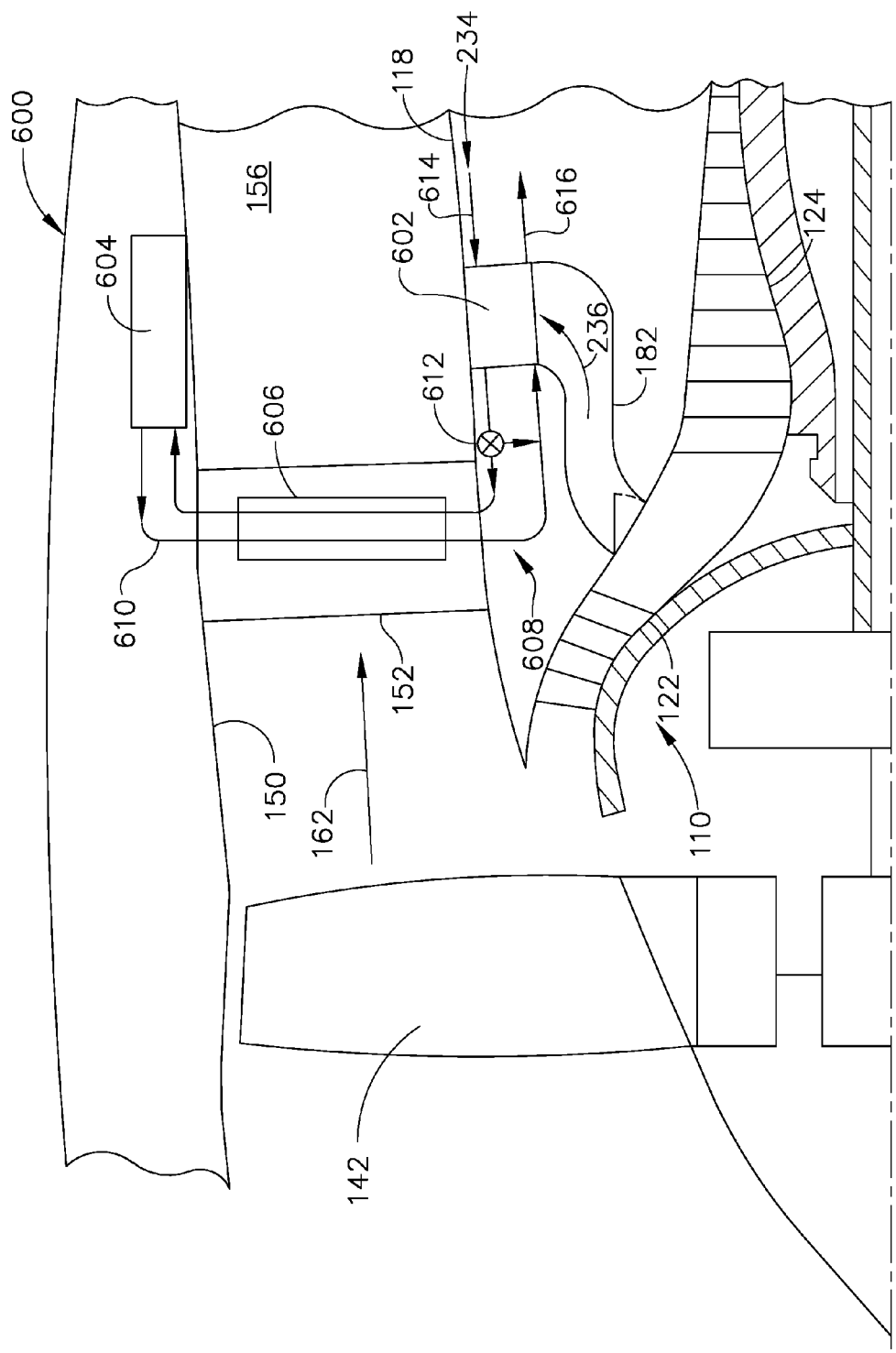
FIG. 6 is a schematic view of an exemplary oil cooling system that may be used with the turbofan engine shown in FIG. 1.

FIG. 6 is a schematic view of an exemplary oil cooling system 600 that may be used with turbofan engine 110 (shown in FIG. 1). Oil cooling system 600 includes a radially inner first heat exchanger assembly 602 positioned at engine outer casing 118 and adjacent to bypass duct 156. In the exemplary embodiment, first heat exchanger assembly 602 is a finned-tube heat exchanger coupled in flow communication with VBV system 182 and bypass duct 156, such as heat exchanger assemblies 200, 300, and 400 described above in FIGS. 2-4, for extracting heat in oil 234. Additionally, oil cooling system 600 includes a radially outer second heat exchanger assembly 604 and a third outlet guide vane (OGV) heat exchanger assembly 606 to facilitate further thermal management of oil flow 234. Each heat exchanger assembly 602, 604, and 606 is coupled in flow communication with each other through a header system 608 that includes at least one conduit 610 that channels oil 234 therethrough. Oil cooling system 600 further includes a bypass valve 612 positioned between first heat exchanger assembly 602 and OGV heat exchanger assembly 606 such that oil 234 may bypass second and third heat exchanger assemblies 604 and 606.

In the exemplary embodiment, second heat exchanger assembly 604 is positioned at radially inner surface 150 of outer nacelle 148 and adjacent to bypass duct 156. Second heat exchanger assembly 604 may be a surface cooler heat exchanger. Alternatively, second heat exchanger assembly 604 may be a tubular heat exchanger similar to heat exchanger assemblies 200, 300, and 400 described above in FIGS. 2-4. In this exemplary embodiment, second heat exchanger assembly 604, however, will not be coupled in flow communication with VBV system 182. Second heat exchanger assembly 604 is coupled in flow communication with bypass duct 156 such that a portion of fan stream air 162, drawn through by an ejector (not shown), is used for coolant. OGV heat exchanger assembly 606 is positioned on OGV assembly 152 and may be a surface cooler heat exchanger such that fan stream air 162 is used for coolant. In alternative embodiments, first, second, and third heat exchanger assemblies 602, 604, and 606 may have any other configuration that enables oil cooling system 600 to function as described herein.

During operation of turbofan engine 110, oil flow 234 is channeled through oil cooling system 600 for thermal management. Specifically, oil flow 234 is channeled to first heat exchanger assembly 602 though an inlet connection 614 of header system 608 and conduit 610. At first heat exchanger assembly 602, heat is extracted from oil 234 by either VBV discharge air 236 acting as the coolant during low speed engine operation and a first operational mode, or a portion of fan stream air 162 acting as the coolant during high speed engine operation and a second operational mode. During low oil heat demands, or during low speed engine operation, oil flow 234 may bypass second and third heat exchanger assemblies 604 and 604 through bypass valve 612. However, during high oil heat demands, then oil 234 is channeled to OGV heat exchanger assembly 606 and second heat exchanger assembly 604 though header system 608 and conduits 610, wherein fan stream air 162 acts as the coolant for extracting heat from oil 234. After cooling, oil 234 is channeled out of oil cooling system 600 at an outlet connection 616 of header system 608 and to engine 116.

The above-described embodiments of an oil cooling system as provide a multiple cooling path heat exchanger assembly that facilitates cooling engine oil subjected to high heat demands during both low speed engine operating conditions and high speed engine operating conditions. Specifically, the heat exchanger assembly includes a cooling channel that receives a flow of oil to be cooled. The heat exchanger assembly further includes a first coolant flow duct that is in flow communication with a VBV system such that during low speed engine operating conditions a VBV discharge flow is provided as coolant, and a second coolant flow duct that is in flow communication with a bypass duct such that during high speed engine operating conditions a fan stream air flow is provided as coolant. In various embodiments, the heat exchanger assembly also includes an ejector such that the coolant flowing through the heat exchanger may be further controllable. In certain embodiments, the coolant flows are exhausted into the bypass duct, while in other embodiments, the coolant flows are exhausted to a thermal management system for further thermal management of engine components. The heat exchanger assembly may also be coupled to additional heat exchanger assemblies forming a larger oil cooling system within the bypass duct. In addition to thermal management of engine oil, the heat exchanger assembly also facilitates boundary layer suction of fan stream air at the bypass duct, increasing propulsive thrust therethrough.

An exemplary technical effect of the methods, systems, and apparatus described herein includes at least one of: (a) increases thermal control of engine oil during low speed engine operation; (b) increases thermal control of engine oil during high speed engine operation; (c) enabled for geared turbofan engines with high oil heat load; (d) enabled for un-ducted turbofan engines; (e) enabled for turbofan engine retrofit; (f) increases boundary layer suction for fan stream air flow; (g) decreases engine weight; and (h) improves engine efficiency.

Exemplary embodiments of methods, systems, and apparatus for the oil cooling systems are not limited to the specific embodiments described herein, but rather, components of the systems and/or steps of the methods may be utilized independently and separately from other components and/or steps described herein. For example, the methods may also be used in combination with other systems requiring thermal control, and the associated methods, and are not limited to practice with only the systems and methods as described herein. Rather, the exemplary embodiment can be implemented and utilized in connection with many other applications, equipment, and systems that may benefit from thermal control.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat exchanger assembly of a gas turbine engine comprising an outer engine case, said heat exchanger assembly comprising:
   at least one cooling channel adjacent the outer engine case, said at least one cooling channel configured to receive a flow of fluid to be cooled;
   at least one first coolant flow duct configured to receive a first coolant flow from a first inlet to a first outlet, said first inlet defined in the at least one first coolant flow duct and said first outlet defined in the outer engine case, wherein said at least one cooling channel is disposed between said first inlet and said first outlet;
   at least one second coolant flow duct configured to receive a second coolant flow from a second inlet to a second outlet, said second inlet defined in the outer engine case and said second outlet defined in an outer casing recess, wherein said at least one cooling channel is disposed between said second inlet and said second outlet and wherein a common opening in the outer engine case defines the first outlet and the second inlet; and
   at least one ejector disposed downstream of said at least one cooling channel, said at least one ejector configured to selectively receive a flow of high pressure fluid and draw the second coolant flow through said at least one second coolant flow duct.

2. The heat exchanger assembly in accordance with claim 1 further comprising a filter positioned between said at least one cooling channel and said at least one ejector, adjacent to and downstream of the second outlet, said filter configured to remove particulates entrained within the second coolant flow.

3. The heat exchanger assembly in accordance with claim 1, wherein the gas turbine engine further comprises a fan case assembly at least partially surrounding the outer engine case defining a bypass duct configured to receive a fan stream flow, the second coolant flow includes at least a portion of the fan stream flow, said second outlet of said at least one second coolant flow duct discharges at least one of the second coolant flow and the high pressure fluid flow back into the bypass duct.

4. The heat exchanger assembly in accordance with claim 1, wherein said second outlet of said at least one second coolant flow duct discharges at least one of the second coolant flow and the high pressure fluid flow into a thermal management system of the gas turbine engine.

5. The heat exchanger assembly in accordance with claim 1, wherein said at least one first coolant flow duct is coupled in flow communication with a variable bleed valve (VBV) duct and the first coolant flow includes a VBV discharge flow received from said VBV duct.

6. The heat exchanger assembly in accordance with claim 1, wherein said at least one cooling channel is disposed in the outer casing recess.

7. The heat exchanger assembly in accordance with claim 1 further comprising at least one turning vane disposed at said first inlet, said at least one turning vane configured to direct the flow of first coolant into said at least one first coolant flow duct.

8. A gas turbine engine comprising:
   an engine assembly comprising an outer engine case;
   a fan case assembly at least partially surrounding said outer engine case defining a bypass duct configured to receive a fan stream flow;
   an outlet guide vane assembly comprising a plurality of outlet guide vane segments coupled between said engine assembly and said fan case assembly, said plurality of outlet guide vane segments spaced circumferentially about said engine assembly; and
   a heat exchanger assembly adjacent said outer engine case, said heat exchanger assembly comprising:
      at least one cooling channel recessed within said outer engine case, said at least one cooling channel configured to receive a flow of fluid to be cooled;
      at least one first coolant flow duct configured to receive a first coolant flow from a first inlet to a first outlet during low engine speeds, said first inlet defined in the first coolant flow duct and said first outlet defined in the outer engine case, wherein said at least one cooling channel is disposed between said first inlet and said first outlet;

at least one second coolant flow duct configured to receive a second coolant flow from a second inlet to a second outlet during high engine speeds, said second inlet defined in the outer engine case and said second outlet defined in an outer casing recess, wherein said at least one cooling channel is disposed between said second inlet and said second outlet, and wherein a common opening in the outer engine case defines the first outlet and the second inlet, and at least one ejector disposed downstream of said at least one cooling channel, said at least one ejector configured to selectively receive a flow of high pressure fluid and draw the second coolant flow through said at least one second coolant flow.

9. The gas turbine engine in accordance with claim 8, wherein said heat exchanger assembly is a first heat exchanger assembly, said gas turbine engine further comprising:

at least one second heat exchanger assembly disposed proximate said bypass duct, said second heat exchanger assembly comprising at least one second cooling channel configured to receive the flow of fluid to be cooled; and a header system comprising at least one conduit configured to couple said first heat exchanger assembly and said at least one second heat exchanger assembly in flow communication, said header system further comprising an inlet connection configured to receive the flow of fluid to be cooled from said engine assembly and an outlet connection configured to direct cooled fluid to said engine assembly.

10. The gas turbine engine in accordance with claim 9, wherein said header system further comprises a valve configured to selectively bypass said at least one second heat exchanger assembly with the flow of fluid to be cooled.

11. The gas turbine engine in accordance with claim 9, wherein said at least one second heat exchanger assembly comprises an outlet guide vane heat exchanger assembly adjacent to an outlet guide vane segment of said plurality of outlet guide vane segments and an outer fan case heat exchanger assembly adjacent to said fan case assembly.

12. The gas turbine engine in accordance with claim 8, wherein the second coolant flow includes at least a portion of the fan stream flow, said second outlet of said at least one second coolant flow duct discharges at least one of the second coolant flow and a high pressure fluid flow into said bypass duct.

13. The gas turbine engine in accordance with claim 8 further comprising at least one turning vane disposed at said first inlet, said at least one turning vane configured to direct the flow of first coolant into said at least one first coolant flow duct.

14. A heat exchanger assembly of a gas turbine engine, the gas turbine engine includes a fan case and an outer engine case defining a bypass duct configured to receive a fan stream flow, said heat exchanger assembly comprising:

a recess defined in the outer engine case;

at least one cooling channel disposed in the recess adjacent the bypass duct, said at least one cooling channel configured to receive a flow of fluid to be cooled;

at least one coolant flow duct configured to receive a coolant flow from at least one inlet defined within the bypass duct to at least one outlet defined in the recess, wherein said at least one cooling channel is disposed between said at least one inlet and said at least one outlet;

at least one ejector disposed downstream of said at least one outlet, said at least one ejector configured to selectively receive a flow of high pressure fluid and draw the coolant flow through said at least one coolant flow duct; and a filter disposed adjacent to and downstream of the at least one outlet between said at least one cooling channel and said at least one ejector, said filter configured to remove particulates entrained within the coolant flow.

15. The heat exchanger assembly in accordance with claim 14, wherein said at least one ejector comprises two inlet channels, a first inlet channel is coupled in flow communication with a variable bleed valve (VBV) duct and the high pressure fluid flow includes a VBV discharge flow and a second inlet channel is coupled in flow communication with a bleed air duct and the high pressure fluid flow includes a bleed discharge flow, wherein said first inlet channel is open during low engine speeds and said second inlet channel is open during high engine speeds.

16. The heat exchanger assembly in accordance with claim 14, wherein said at least one inlet comprises at least one inlet cover spaced at a predetermined distance from the outer engine case defining at least one opening therein, wherein the coolant flow further is configured to provide fan stream boundary suction at said at least one opening for the fan stream flow.

17. The heat exchanger assembly in accordance with claim 14, wherein said at least one outlet of said at least one coolant flow duct discharges at least one of the coolant flow and the high pressure fluid flow into a thermal management system of the gas turbine engine.

\* \* \* \* \*